United States Patent

Fujitaka

[19]

[11] Patent Number: 5,861,925
[45] Date of Patent: Jan. 19, 1999

[54] MULTIPLEXED TEXT DATA SAMPLING CIRCUIT

[75] Inventor: Shigeaki Fujitaka, Tokyo, Japan

[73] Assignee: Mitsubishi Denki Kabushiki Kaisha, Tokyo, Japan

[21] Appl. No.: 747,012

[22] Filed: Nov. 7, 1996

[51] Int. Cl.$^6$ .................................................. H04N 7/08
[52] U.S. Cl. ........................................ 348/465; 348/468
[58] Field of Search .................................. 348/465, 468, 348/460, 553, 473, 478; 341/61

[56] References Cited

U.S. PATENT DOCUMENTS

| | | | |
|---|---|---|---|
| 5,463,423 | 10/1995 | Tults ........................................ | 348/465 |
| 5,506,626 | 4/1996 | Yagi et al. ............................... | 348/464 |
| 5,598,219 | 1/1997 | Furuya et al. ........................... | 348/465 |
| 5,657,088 | 8/1997 | Hankinson ............................... | 348/468 |

FOREIGN PATENT DOCUMENTS

| | | |
|---|---|---|
| 1-190089 | 7/1989 | Japan . |
| 6-339143 | 12/1994 | Japan . |

OTHER PUBLICATIONS

Lentz, J. et al., "Television Captioning for the Deaf Signal and Display Specifications," Report No. 3–7709–C, Public Broadcasting Service Engineering and Technical Operations (1980).

Primary Examiner—Victor R. Kostak
Attorney, Agent, or Firm—Burns, Doane, Swecker & Mathis, LLP

[57] ABSTRACT

A multiplexed text data sampling circuit comprises a detecting signal inhibiting circuit (3) for inhibiting delivery of a detecting signal indicating a detection of a start bit of text broadcasting data from a start bit detecting circuit (2) during a predetermined period of time before the start bit appears, and a variable divider (71), responsive to the detecting signal, for dividing a clock signal so as to produce a sampling clock signal to sample the text broadcasting data, and for varying a dividing ratio between the frequency of the clock signal and the frequency of the sampling clock signal in such a manner that the sampling timing for each of bits of the text broadcasting except one or more last bits is adjusted so that each bit except the one or more last bits is sampled in the middle of a period of time during which each bit except the one or more last bits is applied to the sampling circuit, and the sampling timing for each of the one or more last bits is adjusted so that each bit of the one or more last bits is sampled at an earlier time of a period of time during which each bit of the one or more last bits is applied to the sampling circuit.

15 Claims, 10 Drawing Sheets

MULTIPLEXED TEXT DATA SAMPLING CIRCUIT

BACKGROUND OF THE INVENTION

1. Field of the Invention

The present invention relates to a multiplexed text data sampling circuit for use in a data extracting circuit of a multiplexed text broadcasting decoder.

2. Description of the Prior Art

Text broadcasting data (or multiplexed text data) are encoded and multiplexed on a video signal which is included in a television broadcasting wave or which is recorded on a video recording medium such as a laser disk. In general, the multiplexed text data are superimposed on such a video signal during the television vertical blanking interval of the video signal. Then, the multiplexed text data are extracted by a multiplexed text broadcasting decoder built in a television receiver, a multiplexed text broadcasting decoder provided as an adapter, or a multiplexed text broadcasting decoder built in the replay device of a laser disk or the like.

Figure 9:
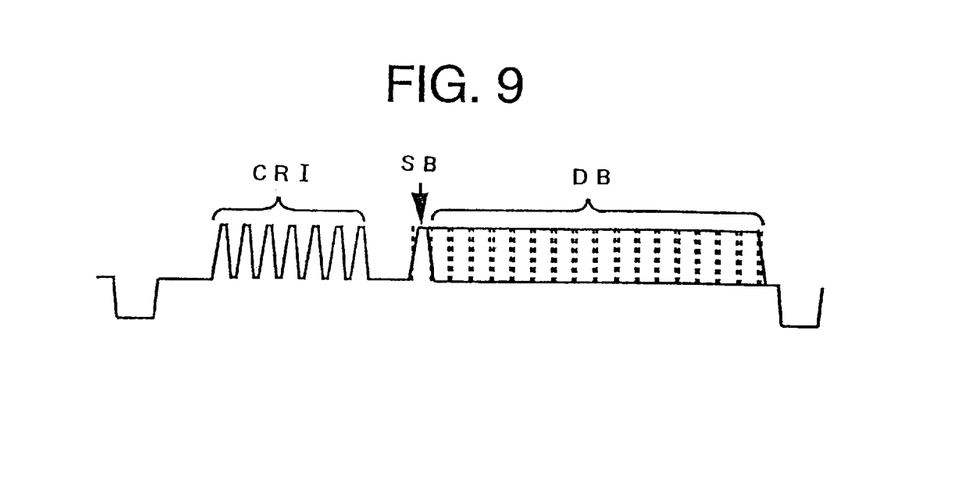
FIG. 9 is a view showing the waveform of a closed captions signal.

Next, a description will be made as to a prior art multiplexed text data sampling circuit, by taking the data extracting circuit of a captions broadcasting decoder for the hard of hearing that live in the U.S.A., which is referred to as a closed captions decoder, as an example. The multiplexed text data which conforms to the closed captions standard (47CFR §15.119 and 73.682) are superimposed as a closed captioning signal shown in FIG. 9 on the 21th scanning line during the vertical blanking interval. As shown in FIG. 9, on the 21th scanning line, there exists a clock run-in interval CRI which consists of a 7-cycle sinusoidal burst, a start bit SB, followed by 16 data bits DB, after a back porch period of time.

Figure 10:
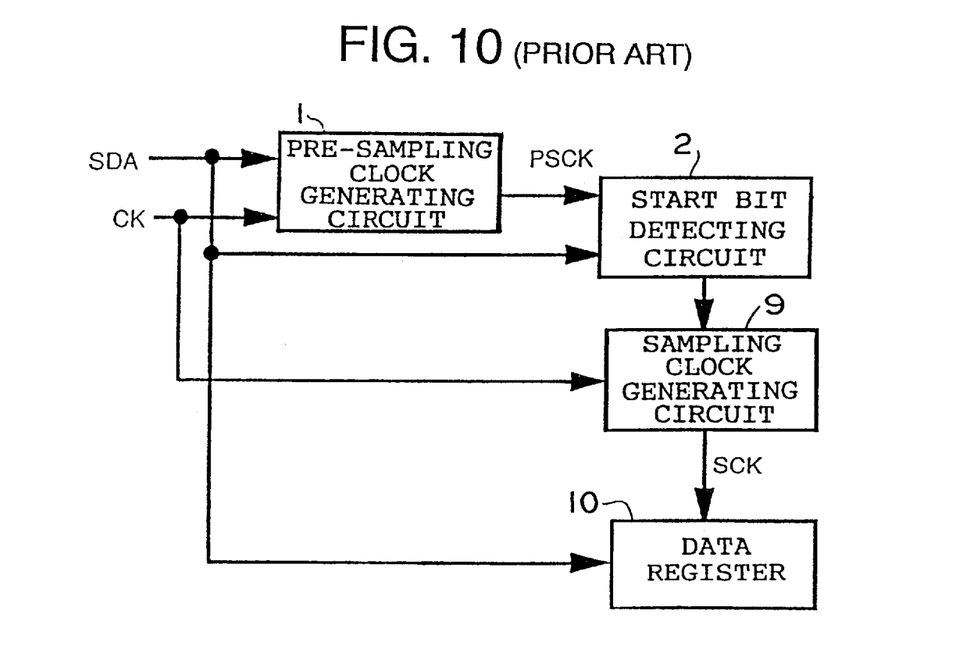
FIG. 10 is a block diagram showing the structure of a prior art multiplexed text data sampling circuit.

Referring now to FIG. 10, it illustrates a block diagram showing the structure of the prior art multiplexed text data sampling circuit for use in the data extracting circuit of the closed captions decoder. In the figure, reference numeral 1 denotes a pre-sampling clock generating circuit for generating a pre-sampling clock signal PSCK from a clock signal CK, 2 denotes a start bit detecting circuit for detecting the start bit SB included in a text broadcasting signal and then delivering a start bit detecting signal when detecting the start bit, 9 denotes a sampling clock generating circuit for generating a sampling clock signal SCK to sample the data bits DB included in the text broadcasting signal in response to the start bit detecting signal from the start bit detecting circuit 2, and 10 denotes a data register for capturing the data bits DB in synchronization with the sampling clock signal SCK.

Figure 11:
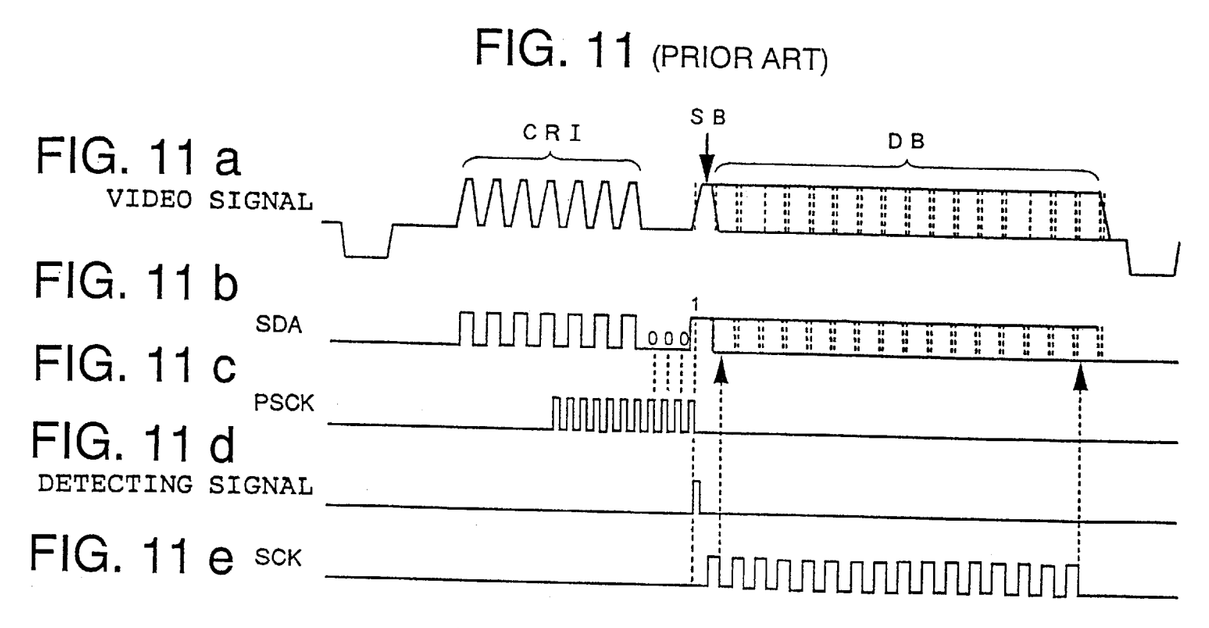
FIGS. 11a to 11e are timing charts for explaining the operation of the prior art multiplexed text data sampling circuit.

Next, a description will be made as to the operation of the prior art multiplexed text data sampling circuit with reference to timing charts shown in FIGS. 11a to 11e. A signal processing circuit (not shown in FIG. 10) of the multiplexed text broadcasting decoder extracts vertical and horizontal synchronizing signals from a video signal. An AFC (automatic frequency control) circuit stabilizes each of these extracted signals. A count circuit (not shown in the figure) disposed within the multiplexed text broadcasting decoder can find the position of the 21th scanning line included in the video signal by counting the number of pulses of the horizontal synchronizing signal, the counting operation being triggered by the vertical synchronizing signal. A binary encoding circuit (not shown in the figure) converts the signal on the 21th scanning line into a digital signal by comparing the level of the signal on the 21th scanning line with a reference voltage. Hereinafter, the digital signal is referred to as data SDA. The video signal on the 21th scanning line and data SDA are shown in FIGS. 11a and 11b, respectively.

The data SDA are applied to the sampling circuit, as shown in FIG. 10. A clock signal CK of given frequency is also supplied to the sampling circuit. The frequency of the clock signal CK is, for example, twenty times as high as that of the data SDA. The pre-sampling clock generating circuit 1 generates a pre-sampling clock signal PSCK, the phase of which is synchronized with the phase of the data SDA that appear during the clock run-in interval CRI. For example, if the clock signal CK is delivered by the AFC circuit and is synchronized with the horizontal synchronizing signal or pulses that appear during the clock run-in interval CRI, the pre-sampling clock generating circuit 1 can easily generate the pre-sampling clock signal PSCK by dividing the clock signal CK. In the example shown in FIG. 11c, the frequency of the pre-sampling clock signal PSCK is two times as high as that of the pulses that appear during the clock run-in interval CRI. Furthermore, in the example shown in FIG. 11c, the output of the pre-sampling clock signal PSCK is started from the fourth data period of the data SDA that appears during the clock run-in interval CRI.

The start bit detecting circuit 2 samples the data SDA by using the pre-sampling clock signal PSCK and compares each sampled data with a predetermined value. The start bit detecting circuit 2 detects the start bit SB by determining whether a certain pattern appears in the data SDA. As shown in FIG. 11b, since the digital value of the start bit SB is "1" and there exists a blank period between the clock run-in interval CRI and the start bit SB, a digital "0001" can be defined as the certain pattern, for example. The start bit detecting circuit 2 includes, for example, a 4-bit shift register and a 4-bit comparator, and sequentially stores each sampled data in the shift register. Then, the comparator compares the contents of the shift register with the predetermined value. When the comparator determines that they are equal to each other, the start bit detecting circuit 2 furnishes a start bit detecting signal.

When the start bit detecting signal is delivered to the sampling clock generating circuit 9, it starts to generate a sampling clock signal SCK by dividing the clock signal CK, after a predetermined time elapses. The sampling clock generating circuit 9 sets the dividing ratio between the frequency of the original signal, i.e. the clock signal CK and the frequency of the signal obtained by the dividing, i.e. the sampling clock signal SCK in such a manner that the frequency of the sampling clock signal SCK is equal to the frequency of the data bits DB. Furthermore, the predetermined time is determined such that the sampling timing defined by the sampling clock signal SCK is adjusted so that the sampling for each of the data bit DB is carried out at an earlier time within a period of time during which each bit of the data bits DB is input to the sampling circuit. The sampling clock signal SCK having 16 cycles of pulses is delivered. When the clock signal CK is output by the AFC circuit and is synchronized with the horizontal synchronizing signal or pulses of the data SDA that appear during the clock run-in interval CRI, the sampling clock generating circuit 9 can easily generate the sampling clock signal SCK synchronized with the data bits DB by only dividing the clock signal CK with a predetermined dividing ratio since the data bits DB are synchronized with the horizontal synchronizing signal or pulses that appear during the clock run-in interval CRI.

The data register 10 is constructed of a 16-bit shift register. It samples the data SDA when the state of sampling clock signal SCK changes, for example, at the falling edge of the sampling clock signal. That is, every time the sampling clock signal SCK makes a high to low transition, the data register captures each of the data SDA and shifts its contents. Since the sampling clock signal SCK is synchronized with the data bits DB included in the data SDA, the data register 10 can capture each of the data bits DB sequentially by virtue of the sampling clock signal SCK. Finally, when the sampling clock generating circuit 9 becomes a state of outputting no sampling clock signal SCK, all the 16-bit data bits DB are stored in the data register 10. A circuit disposed in a backward stage of the data extracting circuit of the multiplexed text broadcasting decoder can obtain closed captions data by reading the data from the data register 10.

The reasons why the sampling clock generating circuit 9 sets the phase of the sampling clock signal SCK such that the sampling timing for each of the data bits DB is adjusted so that each sampling is carried out at an earlier time within a period of time during which each of the data bits DB is applied to the sampling circuit are as follows.

When replaying the contents stored in a specific laser disk by using a specific laser disk player, the data width of the last bit (the 16th bit) of the data bits DB on a video signal replayed becomes narrower than its nominal value. Therefore, if the sampling timing for each of the data bits DB is adjusted so that each sampling is carried out in the middle of a period of time during which each of the data bits DB is applied to the data sampling circuit, the margin of a time lag which can be introduced into the sampling timing is decreased. Accordingly, the captions data superimposed on the video signal cannot be extracted properly under certain circumstances.

Furthermore, when the multiplexed text broadcasting decoder receives a television broadcasting wave for use in a CATV system, there is a possibility that unnecessary data called a rabbit ear are mixed into the video signal which was scrambled for maintaining cable security and was descrambled, at the back of the 16th one of the data bits DB. If the sampling timing is adjusted so that each sampling is carried out at an earlier time within a period of time during which each of the data bits DB is applied to the multiplexed text data sampling circuit, there is a possibility that the captions data cannot be extracted properly.

Figure 12:
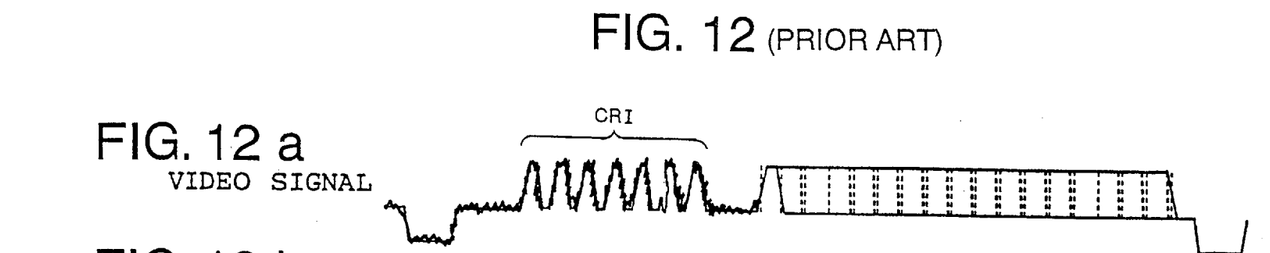
FIGS. 12a to 12e are timing charts for explaining the operation of the prior art multiplexed text data sampling circuit in the case of processing a video signal including a noise.

Thus, the prior art multiplexed text data sampling circuit having the structure as mentioned above suffers from disadvantages as follows:

1. Detecting the data bits DB is started when a pre-sampled binary value of the data SDA is coincident with a predetermined value. Then, the output of the sampling clock signal SCK is started. However, if the video signal includes a noise caused by for example a weak electric field, an error occurs in the data SDA and hence the sampling clock signal SCK is delivered to the data register at an earlier time than it is usually delivered. Although the start bit detecting signal must be output at a point Q, for example, if a data error occurs at a point P within the clock run-in interval CRI, as shown in FIG. 12d, the start bit detecting signal can be output at a point R. Since this early output causes the sampling clock generating circuit to start to generate a sampling clock signal SCK with 16 pulses at the point R, the closed captions data cannot be captured properly.

2. In general, the prior art multiplexed text data sampling circuit is susceptible to ghost interference before and after the video signal varies. Since the sampling timing is adjusted such that the sampling for each of the data bits DB is carried out at an earlier time within a period of time during which each bit is applied to the sampling circuit, the process of capturing the data bits DB is susceptible to ghost interference. On the contrary, if the sampling timing is shifted in time away from the middle of a period of time during which each of the data bits is applied to the sampling circuit, the process of capturing the data bits DB can be susceptible to a noise caused by, for example, a weak electric field. This increases the possibility of capturing wrong closed captions data. When closed captions data cannot be captured properly, wrong captions are displayed on television.

SUMMARY OF THE INVENTION

The object of the present invention is to overcome the above problems. More precisely, it is an object of the present invention to provide a multiplexed text data sampling circuit which is not susceptible to a noise caused by, for example, a weak electric field, and ghost interference.

Prior art devices which can serve such a purpose are disclosed in Japanese Patent Application Publications (KOKAI) No. 1-190089 and No. 6-339143.

In accordance with one aspect of the present invention, there is provided a multiplexed text data sampling circuit comprising: a start bit detecting circuit for detecting a start bit indicating a start of text broadcasting data included in a multiplexed text broadcasting signal superimposed on a video signal and for outputting a detecting signal when detecting the start bit; and a data sampling unit for, when the detecting signal is delivered thereto, sampling each bit of the text broadcasting data except one or more last bits in the middle of a period of time during which each bit except the one or more last bits is applied to the data sampling unit, and for sampling each of the one or more last bits of the text broadcasting data at an earlier time of a period of time during which each bit of the one or more last bits is applied to the data sampling unit.

In accordance with a preferred embodiment of the present invention, the data sampling unit includes a variable divider for dividing a clock signal so as to produce a sampling clock signal to sample the text broadcasting data, and for varying a dividing ratio between the frequency of the clock signal and the frequency of the sampling clock signal in accordance with whether each bit of the text broadcasting data to be sampled belongs to the one or more last bits included in the text broadcasting data.

In accordance with another preferred embodiment of the present invention, the data sampling unit includes a sampling clock generating circuit for generating a sampling clock signal to sample each bit of the text broadcasting data in the middle of a period of time during which each bit of the text broadcasting data is applied to the data sampling unit, and a delay circuit for delaying transmission of each of the one or more last bits of the text broadcasting data to a sampling section of the data sampling unit where each bit of the text broadcasting data is sampled.

In accordance with another preferred embodiment of the present invention, the multiplexed text data sampling circuit further comprises an inhibiting circuit for inhibiting the delivery of the detecting signal to the data sampling unit during a predetermined time period before the start bit indicating the start of the text broadcasting data appears.

Preferably, the inhibiting circuit includes a detecting signal inhibiting circuit for generating a mask signal which is asserted during the predetermined time period before the start bit indicating the start of the text broadcasting data appears, and for preventing the detecting signal output by the start bit detecting circuit from reaching the data sampling unit when the mask signal is active. Alternatively, the inhibiting circuit includes an inhibiting signal generating circuit for generating an operation inhibiting signal which can be asserted during the predetermined time period before the start bit indicating the start of the text broadcasting data appears, so as to inhibit the detecting operation of the start bit detecting circuit.

In accordance with another aspect of the present invention, there is provided a multiplexed text data sampling circuit comprising: a start bit detecting circuit for detecting a start bit indicating a start of text broadcasting data included in a multiplexed text broadcasting signal superimposed on a video signal, and for outputting a detecting signal when detecting the start bit; a data sampling unit for, when the detecting signal is delivered thereto, sampling each bit of the text broadcasting data; and an inhibiting circuit for inhibiting the delivery of the detecting signal to the data sampling unit during a predetermined time period before the start bit indicating the start of the text broadcasting data appears.

Preferably, the inhibiting circuit includes a detecting signal inhibiting circuit for generating a mask signal which is asserted during the predetermined time period before the start bit indicating the start of the text broadcasting data appears, and for preventing the detecting signal output by the start bit detecting circuit from reaching the data sampling unit when the mask signal is active. Alternatively, the inhibiting circuit includes an inhibiting signal generating circuit for generating an operation inhibiting signal which can be asserted during the predetermined time period before the start bit indicating the start of the text broadcasting data appears, so as to inhibit the detecting operation of the start bit detecting circuit.

Further objects and advantages of the present invention will be apparent from the following description of the preferred embodiments of the invention as illustrated in the accompanying drawings.

DETAILED DESCRIPTION OF THE PREFERRED EMBODIMENTS

Figure 1:
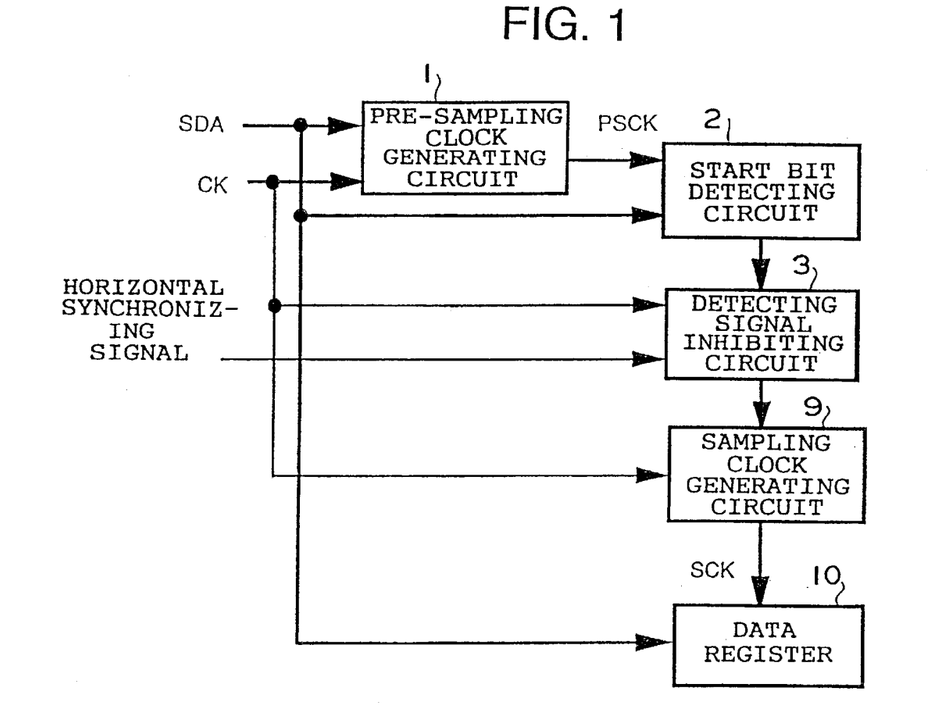
FIG. 1 is a block diagram showing the structure of a multiplexed text data sampling circuit according to a first embodiment of the present invention.

Referring now to FIG. 1, it illustrates a block diagram showing the structure of a multiplexed text data sampling circuit according to a first embodiment of the present invention. In the figure, reference numeral 1 denotes a pre-sampling clock generating circuit for generating a pre-sampling clock signal PSCK from a clock signal CK, 2 denotes a start bit detecting circuit for detecting a start bit SB included in a text broadcasting signal and then delivering a start bit detecting signal indicating that it has detected the start bit, and 3 denotes a detecting signal inhibiting circuit for setting a mask period defined as a period of time during which the output of the start bit detecting signal is inhibited, and for disabling the start bit detecting signal which is delivered thereto during the mask period. Hereinafter, the output of the detecting signal inhibiting circuit 3 is referred to as a masked start bit detecting signal. Furthermore, 9 denotes a sampling clock generating circuit for generating a sampling clock signal SCK to sample data bits DB included in the text broadcasting signal in response to the masked start bit detecting signal from the detecting signal inhibiting circuit 3, and 10 denotes a data register for capturing the data bits DB in synchronization with the sampling clock signal SCK. A data sampling. unit according to this embodiment is composed of the sampling clock generating circuit 9 and data register 10.

Next, a description will be made as to the operation of the multiplexed text data sampling circuit of this embodiment with reference to timing charts shown in FIGS. 2a to 2g. The process of extracting data SDA is the same as that in the prior art circuit mentioned above. The data SDA are applied to the multiplexed text data sampling circuit, as shown in FIG. 1. Then, the pre-sampling clock generating circuit 1 and start bit detecting circuit 2 operate in the same manner as the prior art circuits mentioned above, as shown in FIGS. 2c to 2e, and the start bit detecting circuit 2 outputs a start bit detecting signal.

The detecting signal inhibiting circuit 3 receives a horizontal synchronizing signal as well as a clock signal CK, and generates a mask signal having an active time period associated with a period of time between the instant when the horizontal synchronizing signal is delivered thereto and the instant when the start bit is generated. In this embodiment, a mask signal having an active time period between the instant when the horizontal synchronizing signal is delivered thereto and the instant when a clock run-in interval CRI is concluded is generated, as shown in FIG. 2e. Although the detecting signal inhibiting circuit 3 receives the start bit detecting signal from the start bit detecting circuit 2, it prevents the start bit detecting signal from passing therethrough during the active time period of the mask signal. During the nonactive time period of the mask signal, the start bit detecting signal is allowed to pass through the detecting signal inhibiting circuit 3.

Figures 2A, 2B:
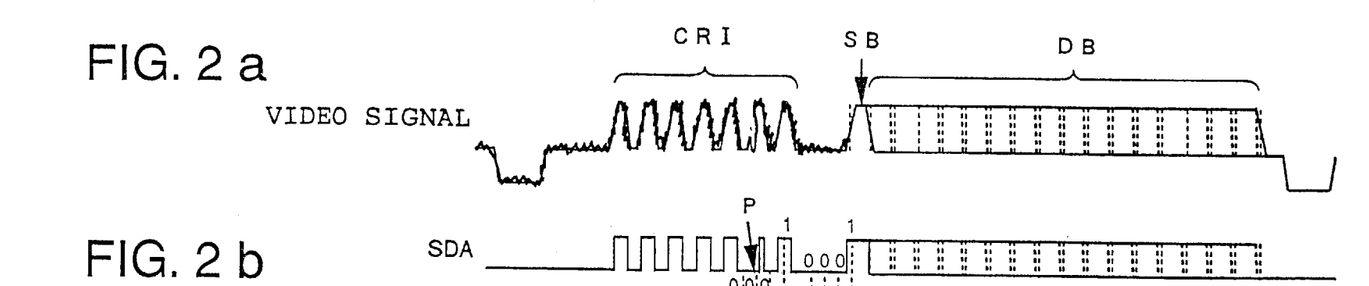
FIGS. 2a to 2g are timing charts for explaining the operation of the multiplexed text data sampling circuit according to the first embodiment of the present invention.
Figures 2C, 2D:
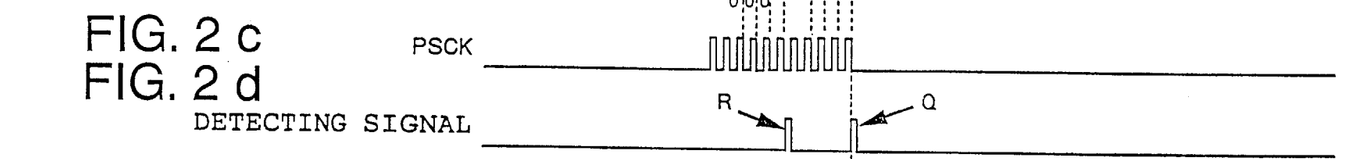
Figure 2E:
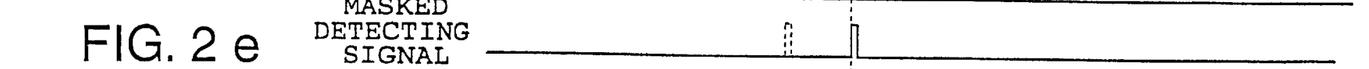

Assume that the video signal includes a noise, as shown in FIG. 2a, and a data error occurs at a point P during the clock run-in interval CRI, as shown in FIG. 2b. In this case, the start bit detecting circuit 2 outputs a start bit detecting signal at a point R, as shown in FIG. 2d. The aforementioned prior art sampling circuit starts to generate a sampling clock signal SCK at the point R, as shown in FIG. 12e, and therefore the closed captions data cannot be captured properly. On the contrary, the detecting signal inhibiting circuit 3 in the sampling circuit according to this embodiment can prevent the start bit detecting signal generated at the point R from passing therethrough. Accordingly, the sampling clock generating circuit 9 does not start to generate the sampling clock signal SCK at the point R.

Figure 2F:
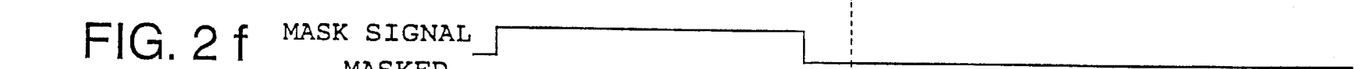
Figure 2G:
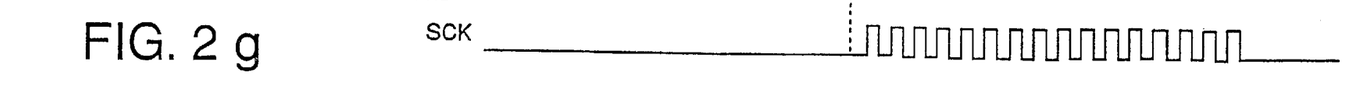

Since the start bit detecting circuit 2, at the point Q, determines that a pattern "0001" has appeared in the data SDA, it delivers a start bit detecting signal. The mask signal makes a transition from the active state to the non-active state before the start bit SB is applied to the multiplexed text data sampling circuit. Thus, the detecting signal inhibiting circuit 3 allows the start bit detecting signal generated at the point Q to pass therethrough, as shown in FIG. 2f. As a result, the sampling clock generating circuit 9 starts to generate a sampling clock signal SCK at the point Q, as shown in FIG. 2g. That is, the generation of the sampling clock signal SCK can be started from the instant when it must be started properly. The data register 10 operates in the same manner as the prior art sampling circuit, and captures the closed captions data.

As previously mentioned, according to this embodiment, the sampling clock generating circuit 9 can generate a properly timed sampling clock signal SCK even though the video signal includes a noise caused by a weak electric field. Accordingly, this embodiment can provide a multiplexed text data sampling circuit having high noise immunity.

Figure 3:
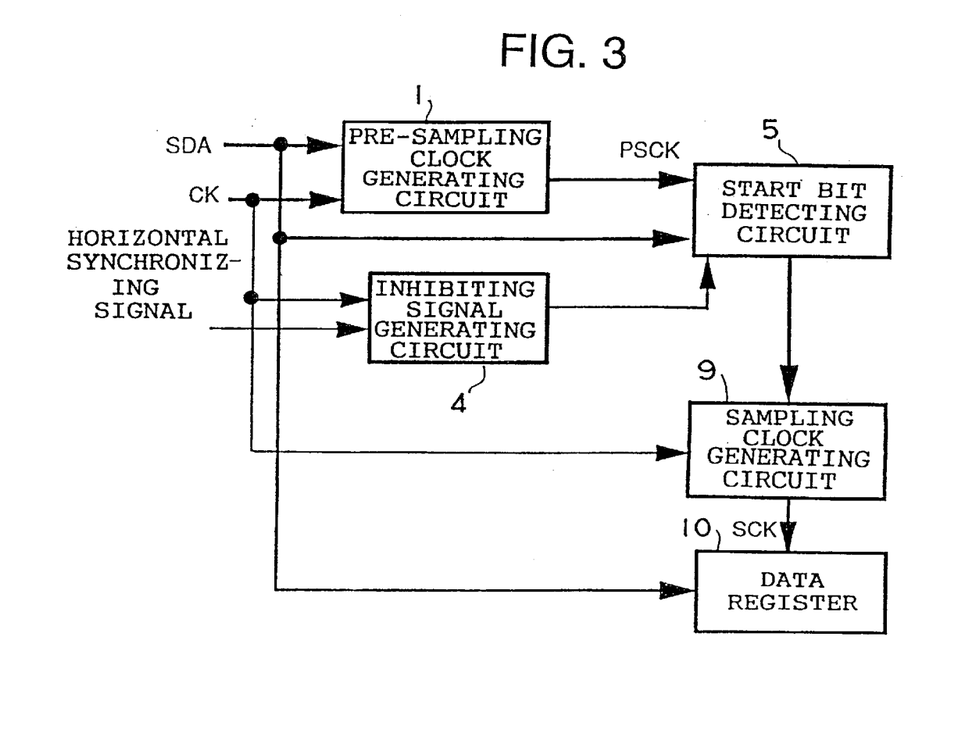
FIG. 3 is a block diagram showing the structure of a multiplexed text data sampling circuit according to a second embodiment of the present invention.

Referring now to FIG. 3, it illustrates a block diagram showing the structure of a multiplexed text data sampling circuit according to a second embodiment of the present invention. In the figure, reference numeral 1 denotes a pre-sampling clock generating circuit for generating a pre-sampling clock signal PSCK from a clock signal CK, 4 denotes an inhibiting signal generating circuit for generating an operation inhibiting signal to inhibit a process of detecting a start bit SB included in a text broadcasting signal, and 5 denotes a start bit detecting circuit for detecting the start bit SB when the operation inhibiting signal is disenabled, and for outputting a start bit detecting signal when it detects the start bit. Furthermore, 9 denotes a sampling clock generating circuit for generating a sampling clock signal SCK to sample data bits DB included in the text broadcasting signal in response to the start bit detecting signal from the start bit detecting circuit 5, and 10 denotes a data register for capturing the data bits DB in synchronization with the sampling clock signal SCK.

Next, a description will be made as to the operation of the multiplexed text data sampling circuit of this embodiment with reference to timing charts shown in FIGS. 4a to 4f. The process of extracting data SDA is the same as that in the first embodiment mentioned above. The data SDA are applied to the multiplexed text data sampling circuit, as shown in FIG. 3. Then, the pre-sampling clock generating circuit 1 operates in the same manner as the prior art circuit mentioned above, and outputs a pre-sampling clock signal PSCK, as shown in FIG. 4c.

The inhibiting signal generating circuit 4 receives a horizontal synchronizing signal as well as a clock signal CK, and generates an inhibiting signal having an active time period associated with a period of time between the instant when the horizontal synchronizing signal is delivered thereto and the instant when a start bit SB is applied to the multiplexed text data sampling circuit. In this embodiment, the inhibiting signal having an active time period between the instant when the horizontal synchronizing signal is delivered thereto and the instant when a clock run-in interval CRI is concluded is generated, as shown in FIG. 4d. The operation inhibiting signal is applied to the start bit detecting circuit 5. The start bit detecting circuit 5 does not perform its detecting operation during the operation inhibiting signal remains in its active state. During the operation inhibiting signal remains in its non-active state, the start bit detecting circuit 5 operates in the same manner as the start bit detecting circuit 3 according to the first embodiment. That is, the start bit detecting circuit 5 delivers a start bit detecting signal when it determines that a pattern "0001" has appeared in the data SDA during the operation inhibiting signal remains in its non-active state.

Figure 4:
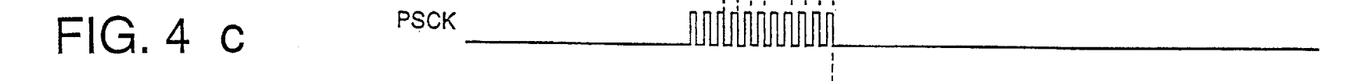
FIGS. 4a to 4f are timing charts for explaining the operation of the multiplexed text data sampling circuit according to the second embodiment of the present invention.

Assume that the video signal includes a noise, as shown in FIG. 4a, and a data error occurs at a point P during the clock run-in interval CRI, as shown in FIG. 4b. In this case, the start bit detecting circuit 5 does not output a start bit detecting signal even though a pattern "0001" has appeared in the data SDA due to the data error, because the operation inhibiting signal remains in its active state until the clock run-in interval CRI is concluded. After that, the operation inhibiting signal makes a transition to its non-active state before a start bit SB is delivered to the multiplexed text data sampling circuit. Therefore, the start bit detecting circuit 5 outputs a start bit detecting signal when a true start bit SB appears in the multiplexed text data sampling circuit, as shown in FIG. 4e. Accordingly, the sampling clock generating circuit 9 starts to generate a sampling clock signal SCK at the point Q, as shown in FIG. 4f. That is, the generation of the sampling clock signal SCK can be started from the instant when it must be started properly. The data register 10 operates in the same manner as that of the first embodiment, and hence captures the closed captions data.

As previously mentioned, according to this embodiment, the start bit detecting circuit 5 does not deliver a wrongly timed start bit detecting signal even though the video signal includes a noise caused by, for example, a weak electric field. Thus, the sampling clock generating circuit 9 can generate a properly timed sampling clock signal SCK. Accordingly, this embodiment can provide a multiplexed text data sampling circuit having high noise immunity.

Figure 5:
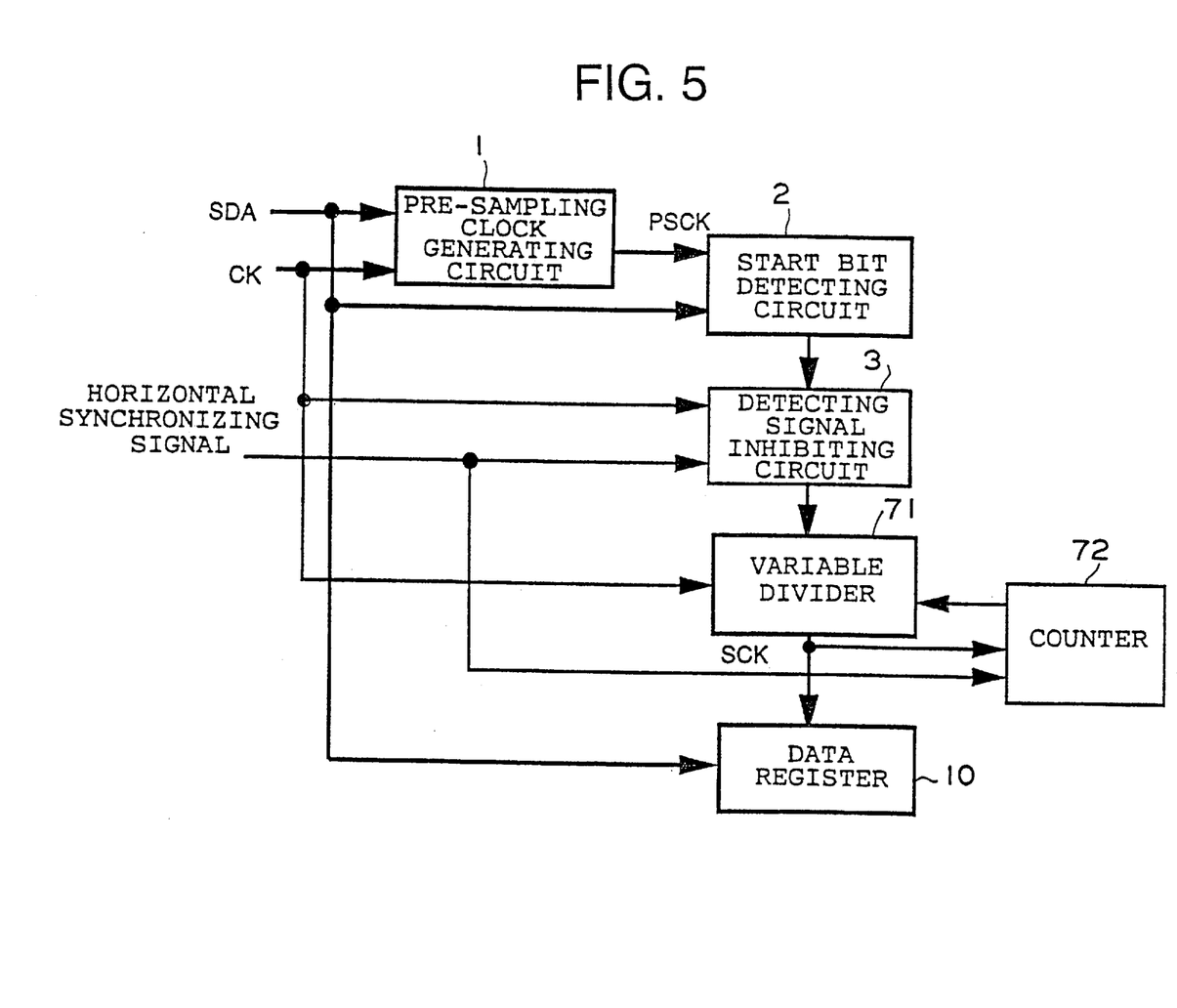
FIG. 5 is a block diagram showing the structure of a multiplexed text data sampling circuit according to a third embodiment of the present invention.
Figure 6:
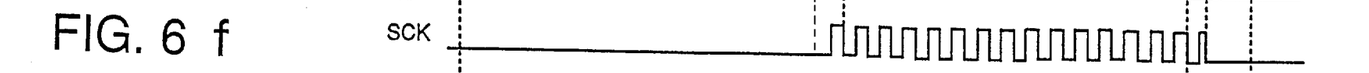
FIGS. 6a to 6g are timing charts for explaining the operation of the multiplexed text data sampling circuit according to the third embodiment of the present invention.

Referring now to FIG. 5, it illustrates a block diagram showing the structure of a multiplexed text data sampling circuit according to a third embodiment of the present invention. The sampling circuit according to this embodiment is provided with a variable divider 71 and a counter 72 instead of the sampling clock generating 9 in the sampling circuit according to the first embodiment, and the other components in the sampling circuit according to the first embodiment. The conventional sampling clock generating circuit 9 includes a divider with a fixed dividing ratio, which starts to generate a sampling clock signal SCK at the conclusion of a predetermined elapsed time after a start bit detecting signal was delivered. On the contrary, the variable divider 71 can vary the dividing ratio in accordance with the count value by the counter 72. A data sampling unit according to this embodiment is comprised of the data register 10, counter 72, and variable divider 71.

Next, a description will be made as to the operation of the multiplexed text data sampling circuit of this embodiment with reference to timing charts shown in FIGS. 6a to 6g. The pre-sampling clock generating circuit 1, start bit detecting circuit 2, and detecting signal inhibiting circuit 3 operate in the same manner as those in the sampling circuit according to the first embodiment, as shown in FIGS. 6a to 6e. Hereinafter, the first through fifteenth bit of data bits DB are designated by DB1 through DB15, respectively, and the sixteenth bit of the data bits DB is designated by DB16.

When the variable divider 71 receives a masked start bit detecting signal from the detecting signal inhibiting circuit 3, it starts to divide the frequency of a clock signal CK after a predetermined time elapses so as to generate a sampling clock signal SCK. The dividing ratio between the frequency of the original signal, i.e. the clock signal CK and the frequency of the signal obtained by the dividing, i.e. the sampling clock signal SCK is predetermined in such a manner that the frequency of the sampling clock signal SCK is equal to the frequency of the data bits DB. Furthermore, the predetermined elapsed time is predetermined such that each sampling timing determined by the sampling clock signal SCK is adjusted so that the sampling for each of the bits DB1 to DB15 included in the data bits DB is carried out in the middle of a period of time during which each bit is applied to the sampling circuit.

When the counter 72 is initialized by the horizontal synchronizing signal, it starts to count the sampling clock signal SCK. When the counter 72 counts 15 pulses of the sampling clock signal SCK, it asserts a count signal. When the count signal makes a transition to its active state, the variable divider 71 varies the dividing ratio. For example, if the frequency of the clock signal is 26 times as high as that of the sampling clock signal SCK, half the time period of each pulse in the sampling clock signal SCK is created by counting 13 cycles of the clock signal CK when generating a pulse of the sampling clock signal SCK used to sample each of the bits DB1 to DB15. On the other hand, a pulse to sample the last bit DB16 is generated by counting fewer cycles of the clock signal CK than those for the other bits DBl to DB15 mentioned above. As a result, the sampling for the last bit DB16 which is triggered by the pulse of the sampling clock signal SCK can be carried out at an earlier time within a period of time during which the bit DB16 is applied to the sampling circuit.

Thus, each of the first to fifteenth pulses of the sampling clock signal SCK is generated such that the sampling timing for each of the bits DBl to DB15 included in the data bits DB is adjusted to be in the middle of a period of time during which each bit appears in the sampling circuit. In addition, the sixteenth pulse of the sampling clock signal SCK is generated such that the sampling timing for the last bit DB16 included in the data bits DB is adjusted to be at an earlier time within a period of time during which the last bit DB16 appears in the sampling circuit. The data register 10 operates in the same manner as that of the first embodiment, and hence captures the closed captions data.

As previously mentioned, according to this embodiment, each of the first to fifteenth bits included in the data bits DB can be sampled in the middle of a period of time during which each of the bits is applied to the sampling circuit. Therefore, the present embodiment can provide a multiplexed text data sampling circuit which is not susceptible to a noise caused by, for example, a weak electric field, and ghost interference. In addition, the sixteenth one among the bits included in the data bits DB can be sampled at an earlier time of a period of time during which the last bit is applied to the sampling circuit. Accordingly, a data error hardly occurs even though the last bit included in the data bits DB becomes deformed when, for example, replaying a laser disk or receiving a CATV signal, like the prior art multiplexed text data sampling circuit.

Some variants may be made in the exemplary embodiment shown. As described above, the multiplexed text data sampling circuit according to this embodiment comprises the variable divider 71 and counter 72, instead of the sampling clock generating circuit 9 according to the first embodiment. Alternatively, the multiplexed text data sampling circuit can comprise the variable divider 71 and counter 72, instead of the sampling clock generating circuit 9 in the multiplexed text data sampling circuit according to the second embodiment, and the other components shown in FIG. 3 according to the second embodiment. It is also apparent that the sampling timing for the last bit and immediately preceding one or more bits can be varied instead of changing the sampling timing for only the last bit.

Figure 7:
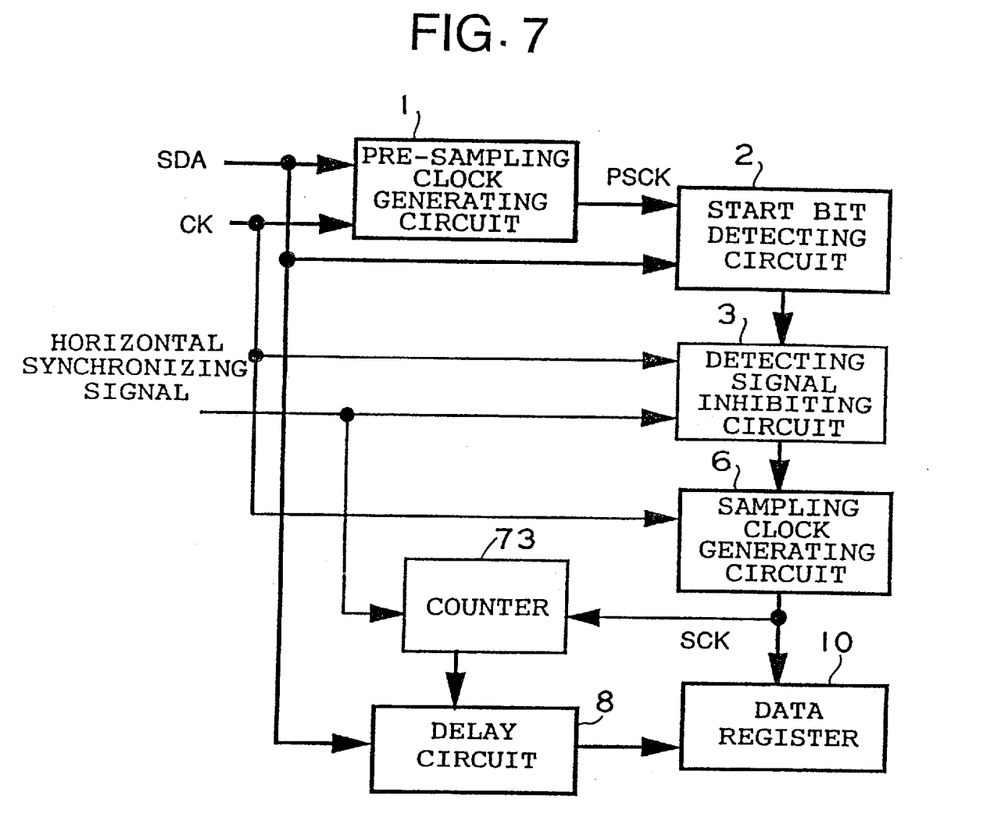
FIG. 7 is a block diagram showing the structure of a multiplexed text data sampling circuit according to a fourth embodiment of the present invention.

Referring now to FIG. 7, it illustrates a block diagram showing the structure of a multiplexed text data sampling circuit according to a fourth embodiment of the present invention. In the figure, reference numeral 1 denotes a pre-sampling clock generating circuit for generating a pre-sampling clock signal PSCK from a clock signal CK, 2 denotes a start bit detecting circuit for detecting a start bit SB included in a text broadcasting signal and then delivering a start bit detecting signal indicating that the start bit detecting circuit has detected the start bit, and 3 denotes a detecting signal inhibiting circuit for setting a mask period defined as a period of time during which it inhibits the output of a start bit detecting delivered thereto, and for disabling a start bit detecting signal which is delivered thereto during the mask period. Hereinafter, the output of the detecting signal inhibiting circuit 3 is referred to as a masked start bit detecting signal. Furthermore, a reference numeral 6 denotes a sampling clock generating circuit for generating a sampling clock signal SCK, each pulse of which rises in the middle of a period of time during which each bit of data bits DB appears in the sampling circuit, in response to the masked start bit detecting signal delivered thereto, 8 denotes a delay circuit for delaying and supplying the data SDA to a data register 10, and 73 denotes a counter which is initialized by a horizontal synchronizing signal, and which counts the sampling clock signal SCK so as to furnish a count signal to the delay circuit 8. A data sampling unit according to this embodiment is comprised of the sampling clock generating circuit 6, delay circuit 8, data register 10, and counter 73.

Figure 8A:
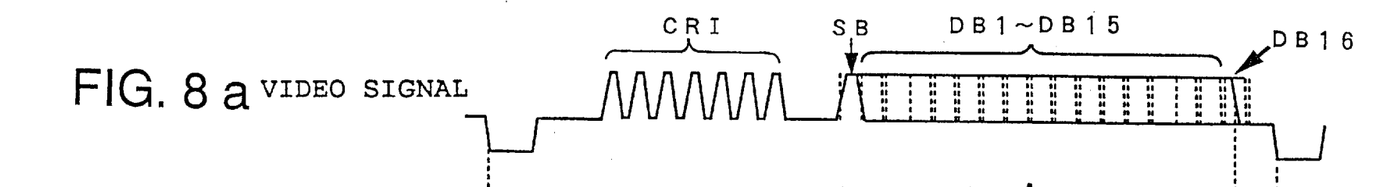
FIGS. 8a to 8h are timing charts for explaining the operation of the multiplexed text data sampling circuit according to the fourth embodiment of the present invention.
Figures 8B, 8C, 8D:
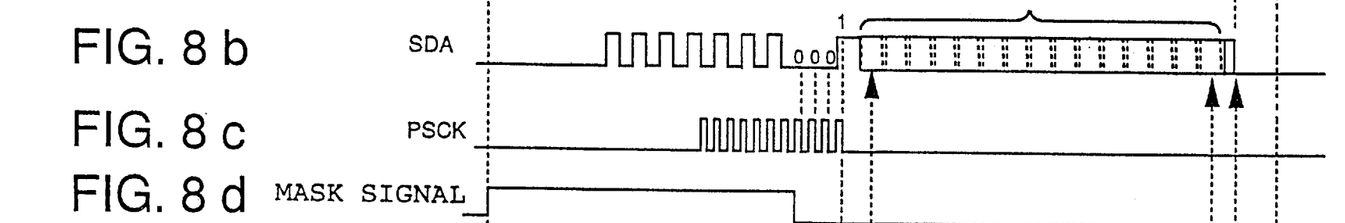
Figures 8E, 8F:
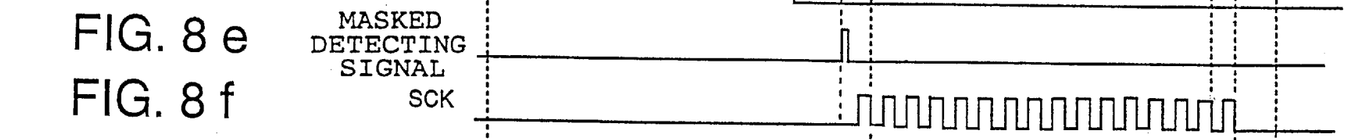
Figure 8G:
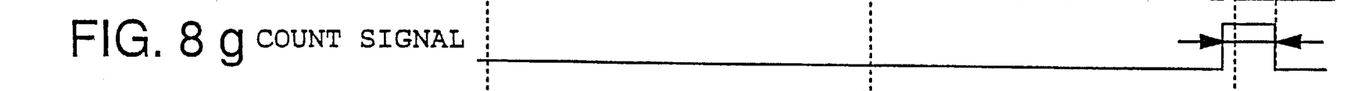

Next, a description will be made as to the operation of the multiplexed text data sampling circuit of this embodiment with reference to timing charts shown in FIGS. 8a to 8h. The pre-sampling clock generating circuit 1, start bit detecting circuit 2, and detecting signal inhibiting circuit 3 operates in the same manner as those of the data sampling circuit according to the first embodiment, as shown in FIGS. 8a to 8e. When the sampling clock generating circuit 6 receives a masked start bit detecting signal, it starts to divide the frequency of a clock signal CK after a predetermined time elapses so as to start to generate a sampling clock signal SCK, as shown in FIG. 8f. The dividing ratio between the frequency of the original signal, i.e. the clock signal CK and the frequency of the signal obtained by the dividing, i.e. the sampling clock signal SCK is determined in such a manner that the frequency of the sampling clock signal SCK is equal to the frequency of the data bits DB. Furthermore, the predetermined time is defined such that the sampling timing determined by the sampling clock signal SCK is adjusted so that the sampling for each of the bits DB1 to DB15 included in the data bits DB is carried out in the middle of a period of time during which each of the data bits DB is applied to the sampling circuit.

Figure 8H:
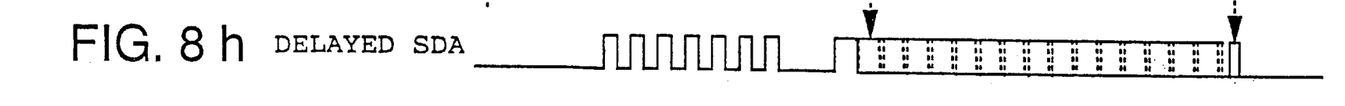

When the counter 73 is initialized by the horizontal synchronizing signal, it starts to count the sampling clock signal SCK. When the sixteenth pulse of the sampling clock signal SCK rises, the counter 73 asserts a count signal. When the count signal makes a transition to its active state, the delay circuit 8 delays transmission of the data SDA to the data register 10 by a predetermined delay and supplies them to the data register 10. The predetermined delay is defined so as to set the sampling timing for the last bit DB16 included in the data bits DB to be at an earlier time within a period of time during which the bit DB16 is applied to the sampling circuit, as shown in FIG. 8h. When the count signal is not active, the delay circuit 8 does not delay transmission of the data SDA to the data register.

The data register 10 captures the output of the delay circuit 8 and shifts its contents when the sampling clock signal SCK makes a high to low transition. That is, the sampling clock signal SCK causes the data register 10 to capture; the data bits DB sequentially. Since the transmission of the last bit DB16 included in the data bits DB is delayed by the delay circuit 8, the data register 10 can capture the last bit DB16 at an earlier time within a period of time during which the last bit is applied to the sampling circuit.

As previously mentioned, according to this embodiment, each of the first to fifteenth bits included in the data bits DB can be sampled in the middle of a period of time during which each of the bits is input to the sampling circuit. Therefore, the present embodiment can provide a multiplexed text data sampling circuit which is not susceptible to a noise caused by, for example, a weak electric field, and ghost interference. In addition, the sixteenth one among the bits included in the data bits DB can be sampled at an earlier time within a period of time during which the last bit is input to the sampling circuit, by using the function of the delay circuit 8. Accordingly, a data error hardly occurs even though the last bit included in the data bits DB becomes deformed when, for example, replaying a laser disk or receiving a CATV signal, like the prior art multiplexed text data sampling circuit.

Numerous variants may be made in the exemplary embodiment. As previously mentioned, the data sampling circuit according to this embodiment is adapted to vary the dividing ratio for the last data bit. Alternatively, the sampling circuit can be adapted to also vary the dividing ratio for the immediately preceding one or more data bits. Furthermore, the multiplexed text data sampling circuit according to this embodiment comprises the sampling clock generating circuit 6, delay circuit 8 and counter 73 instead of the sampling clock generating circuit 9 according to the first embodiment. Alternatively, the multiplexed text data sampling circuit according to this embodiment can comprise the sampling clock generating circuit 6, delay circuit 8 and counter 73, instead of the sampling clock generating circuit 9 in the multiplexed text data sampling circuit according to the second embodiment, and the other components shown in FIG. 3 according to the second embodiment.

It should be noted that though the above description about each of the embodiments of the present invention is made as to a multiplexed text data sampling circuit which can handle multiplexed text data which conforms to the closed captions standard, the present invention can also be applied to a multiplexed text broadcasting decoder which decodes multiplexed text data which conform to another standard. For example, the multiplexed text data sampling circuit according to the present invention can handle multiplexed text data multiplexed on a scanning line other than the 21th line. If multiplexed text data are the data which conform to a standard provided with data form which is similar to the data form including the clock run-in interval CRI and start bit SB, as previously mentioned in each of the embodiments, the multiplexed text data can be decoded.

As previously explained, the present invention offers the following advantages.

In accordance with a preferred embodiment of the present invention, there is provided a multiplexed text data sampling circuit which is adapted to sample each bit of text broadcasting data except one or more last bits in the middle of a period of time during which each bit except the one or more last bits is applied thereto, and for sampling each of the one or more last bits of the text broadcasting data at an earlier time of a period of time during which each of the last bits is applied thereto. Therefore, the embodiment offers an advantage in that since each bit of the text broadcasting data except at least the one or more last bits can be sampled within a period of time during which the sampling is not affected by a noise, the multiplexed text data sampling circuit is not susceptible to a noise caused by for example a weak electric field, and ghost interference.

In accordance with another preferred embodiment of the present invention, the multiplexed text data sampling circuit can include a variable divider for dividing a clock signal so as to produce a sampling clock signal to sample the text broadcasting data, and for varying a dividing ratio between the frequency of the clock signal and the frequency of the sampling clock signal so as to set the sampling timing for each bit of the text broadcasting data in accordance with whether each bit of the text broadcasting data belongs to the one or more last bits. Therefore, the embodiment provides an advantage of being able to stably sample each bit except at least the last bit and sample at least the last bit without introducing errors, by setting the dividing ratio such that the sampling timing for each of the bits except the one or more last bits is adjusted so that each of the bits except the one or more last bits is sampled in the middle of a period of time during which each bit except the one or more last bits is applied to the sampling circuit, and the sampling timing for each of the last bits is adjusted so that each of the last bits is sampled at an earlier time within a period of time during which each of the last bits is applied to the sampling circuit.

In accordance with another preferred embodiment of the present invention, the multiplexed text data sampling circuit can include a sampling clock generating circuit for generating a sampling clock signal to sample each bit of the text broadcasting data in the middle of a period of time during which each bit of the text broadcasting data is applied to the data sampling circuit, and a delay circuit for delaying transmission of each of the one or more last bits of the text broadcasting data to a sampling section of the sampling unit where each bit of the text broadcasting data is sampled. Therefore, the embodiment provides an advantage of being able to stably sample each bit except at least the last bit and sample at least the last bit without introducing errors, by setting the delay of the transmission of each of the last bits such that the sampling timing for each of the last bits is adjusted so that each of the last bits is sampled at an earlier time within a period of time during which each of the last bits is applied to the sampling circuit.

In accordance with another preferred embodiment of the present invention, the multiplexed text data sampling circuit can be adapted to inhibit the delivery of the detecting signal to the data sampling unit during a predetermined period of time before the start bit indicating the start of the text broadcasting data appears. Therefore, the embodiment provides an advantage in that the multiplexed text data sampling circuit is not susceptible to a noise caused by for example a weak electric field, and ghost interference, and it can sample the text broadcasting data with proper timing even though the video signal includes a noise.

In accordance with a preferred embodiment of the present invention, there is provided a multiplexed text data sampling circuit provided with a data sampling unit which samples each bit of the text broadcasting data, and an inhibiting circuit for inhibiting the delivery of a detecting signal from a start bit detecting circuit to the data sampling unit during a predetermined period of time before the start bit indicating the start of the text broadcasting data appears. Therefore, the embodiment provides an advantage in that the multiplexed text data sampling circuit can sample the text broadcasting data with proper timing even though the video signal includes a noise caused by, for example, a weak electric field.

In accordance with another preferred embodiment of the present invention, the multiplexed text data sampling circuit can include a detecting signal inhibiting circuit for generating a mask signal which is asserted during the predetermined time period before the start bit indicating the start of the text broadcasting data appears, and for preventing the detecting signal output by the start bit detecting circuit from reaching the data sampling unit when the mask signal is active. Therefore, the embodiment provides an advantage in that even when a wrong detecting signal resulting from a noise is delivered, the data sampling unit can sample the text broadcasting data not under the influence of the delivery of the wrong detecting signal.

In accordance with another preferred embodiment of the present invention, the multiplexed text data sampling circuit can include an inhibiting signal generating circuit for generating an operation inhibiting signal which can be asserted during the predetermined time period before the start bit indicating the start of the text broadcasting data appears, so as to inhibit the detecting operation of the start bit detecting circuit. Therefore, the embodiment provides an advantage in that the chance that the detecting signal is delivered when the video signal includes a noise caused by for example a weak electric field can be reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A multiplexed text data sampling circuit comprising:
   a start bit detecting means for detecting a start bit indicating a start of text broadcasting data included in a multiplexed text broadcasting signal superimposed on a video signal and for outputting a detecting signal when detecting the start bit; and
   a data sampling means for, when the detecting signal is delivered thereto, sampling each bit of the text broadcasting data except one or more last bits in the middle of a period of time during which each bit except the one or more last bits is applied to said data sampling means, and for sampling each of the one or more last bits of the text broadcasting data at an earlier time within a period of time during which each of the one or more last bits of the text broadcasting data is applied to said data sampling means.

2. The multiplexed text data sampling circuit according to claim 1, wherein said data sampling means includes a variable dividing means for dividing a clock signal so as to produce a sampling clock signal to sample each bit of the text broadcasting data, and for varying a dividing ratio between the frequency of the clock signal and the frequency of the sampling clock signal so as to adjust sampling timing for each bit of the text broadcasting data in accordance with whether each bit of the text broadcasting data belongs to the one or more last bits included in the text broadcasting data.

3. The multiplexed text data sampling circuit according to claim 1, wherein said data sampling means includes a sampling clock generating means for generating a sampling clock signal to sample each bit of the text broadcasting data in the middle of a period of time during which each bit of the text broadcasting data is applied to said data sampling means, and a delay means for delaying transmission of each of the one or more last bits of the text broadcasting data to a sampling section of said data sampling means where each bit of the text broadcasting data is sampled.

4. The multiplexed text data sampling circuit according to claim 1, wherein said multiplexed text data sampling circuit further comprises a means for inhibiting the delivery of the detecting signal to said data sampling means during a predetermined time period before the start bit indicating the start of the text broadcasting data appears.

5. The multiplexed text data sampling circuit according to claim 2, wherein said multiplexed text data sampling circuit further comprises a means for inhibiting the delivery of the detecting signal to said data sampling means during a predetermined time period before the start bit indicating the start of the text broadcasting data appears.

6. The multiplexed text data sampling circuit according to claim 3, wherein said multiplexed text data sampling circuit further comprises an inhibiting means for inhibiting the delivery of the detecting signal to said data sampling means during a predetermined time period before the start bit indicating the start of the text broadcasting data appears.

7. The multiplexed text data sampling circuit according to claim 4, wherein said inhibiting means includes a detecting signal inhibiting means for generating a mask signal which is asserted during the predetermined time period before the start bit indicating the start of the text broadcasting data appears, and for preventing the detecting signal output by said start bit detecting means from reaching said data sampling means when the mask signal is active.

8. The multiplexed text data sampling circuit according to claim 5, wherein said inhibiting means includes a detecting signal inhibiting means for generating a mask signal which is asserted during the predetermined time period before the start bit indicating the start of the text broadcasting data appears, and for preventing the detecting signal output by said start bit detecting means from reaching said data sampling means when the mask signal is active.

9. The multiplexed text data sampling circuit according to claim 6, wherein said inhibiting means includes a detecting signal inhibiting means for generating a mask signal which is asserted during the predetermined time period before the start bit indicating the start of the text broadcasting data appears, and for preventing the detecting signal output by said start bit detecting means from reaching said data sampling means when the mask signal is active.

10. The multiplexed text data sampling circuit according to claim 4, wherein said inhibiting means includes an inhibiting signal generating means for generating an operation inhibiting signal which is asserted during the predetermined time period before the start bit indicating the start of the text broadcasting data appears, so as to inhibit the detecting operation of said start bit detecting means.

11. The multiplexed text data sampling circuit according to claim 5, wherein said inhibiting means includes an inhibiting signal generating means for generating an operation inhibiting signal which is asserted during the predetermined time period before the start bit indicating the start of the text broadcasting data appears, so as to inhibit the detecting operation of said start bit detecting means.

12. The multiplexed text data sampling circuit according to claim 6, wherein said inhibiting means includes an inhibiting signal generating means for generating an operation inhibiting signal which is asserted during the predetermined time period before the start bit indicating the start of the text broadcasting data appears, so as to inhibit the detecting operation of said start bit detecting means.

13. A multiplexed text data sampling circuit comprising:
- a start bit detecting means for detecting a start bit indicating a start of text broadcasting data included in a multiplexed text broadcasting signal superimposed on a video signal, and for outputting a detecting signal when detecting the start bit;
- a data sampling means for, when the detecting signal is delivered thereto, sampling each bit of the text broadcasting data; and
- an inhibiting means for inhibiting the delivery of the detecting signal to said data sampling means during a predetermined time period before the start bit indicating the start of the text broadcasting data appears.

14. The multiplexed text data sampling circuit according to claim 13, wherein said inhibiting means includes a detecting signal inhibiting means for generating a mask signal which is asserted during the predetermined time period before the start bit indicating the start of the text broadcasting data appears, and for preventing the detecting signal output by said start bit detecting means from reaching said data sampling means when the mask signal is active.

15. The multiplexed text data sampling circuit according to claim 13, wherein said inhibiting means includes an inhibiting signal generating means for generating an operation inhibiting signal which is asserted during the predetermined time period before the start bit indicating the start of the text broadcasting data appears, so as to inhibit the detecting operation of said start bit detecting means.

* * * * *